United States Patent
Pearlman et al.

(10) Patent No.: US 6,671,413 B1
(45) Date of Patent: Dec. 30, 2003

(54) EMBEDDED AND EFFICIENT LOW-COMPLEXITY HIERARCHICAL IMAGE CODER AND CORRESPONDING METHODS THEREFOR

(75) Inventors: William A. Pearlman, 851 Maxwell Dr., Niskayuna, NY (US) 12309; Asad Islam, Irving, TX (US)

(73) Assignee: William A. Pearlman, Niskayuna, NY (US)

(*) Notice: Subject to any disclaimer, the term of this patent is extended or adjusted under 35 U.S.C. 154(b) by 0 days.

(21) Appl. No.: 09/489,922

(22) Filed: Jan. 24, 2000

(51) Int. Cl.[7] ................................................. G06K 9/36
(52) U.S. Cl. ......................................................... 382/240
(58) Field of Search ............................... 382/232, 236, 382/238, 240, 242, 248, 250; 348/384.1, 394.1, 395.1, 400.1–404.1, 407.1–416.1, 420.1, 421.1, 425.2, 430.1, 431.1; 375/240.19, 240.23, 240.24; 341/50, 51, 63, 65, 67, 107; 364/724.011, 724.04, 724.05, 724.13, 724.14, 725.01, 725.02

(56) References Cited

U.S. PATENT DOCUMENTS

| | | | | |
|---|---|---|---|---|
| 5,729,691 A | * | 3/1998 | Agarwal ................ | 395/200.77 |
| 5,748,116 A | * | 5/1998 | Chui et al. ............. | 341/50 |
| 5,748,786 A | * | 5/1998 | Zandi et al. ............ | 382/240 |
| 5,764,807 A | * | 6/1998 | Pearlman et al. ....... | 382/240 |
| 5,959,560 A | * | 9/1999 | Said et al. .............. | 341/107 |
| 6,266,450 B1 | * | 7/2001 | Yip et al. ................ | 382/240 |
| 6,345,126 B1 | * | 2/2002 | Vishwanath et al. ... | 382/253 |
| 6,356,665 B1 | * | 3/2002 | Lei et al. ................ | 382/240 |
| 6,359,928 B1 | * | 3/2002 | Wang et al. ............ | 375/240.05 |
| 6,381,280 B1 | * | 4/2002 | Lynch et al. ........... | 375/240.19 |

OTHER PUBLICATIONS

Amir Said and William A. Pearlman, "The Precedence of the Work of Said and Pearlman over Ricoh's CREW," (http://www.cipr.rpi.edu/research/SPIHT/spiht7.html).

* cited by examiner

*Primary Examiner*—Jose L. Couso
(74) *Attorney, Agent, or Firm*—Robert Westerlund; Raymond Powell (57) ABSTRACT

A coder for use in encoding and decoding a data set representing an image includes a first device which partitions the data transformation into first and second sets, which adds the first set into a list of insignificant sets (LIS), and which initializes a list of significant pixels (LSP), a second device which tests the first and second sets for significance with respect to a threshold value, which partitions significant members of the first and second sets in accordance with first and second partitioning functions, respectively, and which adds significant pixels to the LSP, a third device which refmes the quantization of the pixels in the LSP. In operation, the threshold value is decrement as the second and third devices are operation in seriatim until the coding endpoint has been reached. An optional fourth device entropy codes a significance map cooperatively generated by the second and third devices. Methods for encoding and decoding the data transformation of a data set and a computer program for converting a general purpose computer into a hierarchical image coder are also described.

14 Claims, 9 Drawing Sheets

ProcessS($S$)
{
- output $S_n(S)$
- if $S_n(S) = 1$
  – if $S$ is a pixel, output sign of $S$ and add $S$ to LSP
  – else CodeS($S$)
  – if $S \in$ LIS, remove $S$ from LIS
- else
  – if $S \notin$ LIS, add $S$ to LIS
}

Fig. 3A

CodeS($\mathcal{S}$)
{
- Partition $\mathcal{S}$ into four equal subsets $\mathcal{O}(\mathcal{S})$
- for each $\mathcal{O}(\mathcal{S})$
  - output $\mathcal{S}_n(\mathcal{O}(\mathcal{S}))$
  - if $\mathcal{S}_n(\mathcal{O}(\mathcal{S})) = 1$
    * if $\mathcal{O}(\mathcal{S})$ is a pixel, output sign of $\mathcal{O}(\mathcal{S})$ and add $\mathcal{O}(\mathcal{S})$ to LSP
    * else CodeS($\mathcal{O}(\mathcal{S})$)
  - else
    * add $\mathcal{O}(\mathcal{S})$ to LIS

Fig. 3B

```
ProcessI()
{
  • output $S_n(\mathcal{I})$
  • if $S_n(\mathcal{I}) = 1$
      – CodeI()
}
```

Fig. 3C

```
CodeI()
{
  • Partition $\mathcal{I}$ into four sets — three $S$ and one $\mathcal{I}$
  • for each of the three sets $S$
      – ProcessS($S$)
  • ProcessI()
}
```

| Coding method | 0.25 bpp | 0.5 bpp | 1.0 bpp |
|---|---|---|---|
| EZW | 33.17 dB | 36.28 dB | 39.55 dB |
| AGP | 34.10 dB | 37.21 dB | 40.38 dB |
| SPIHT | 34.11 dB | 37.21 dB | 40.44 dB |
| SPECK | 34.03 dB | 37.10 dB | 40.25 dB |

Fig. 6B    PSNR at various rates for Lena (512 x 512)

| Coding method | 0.25 bpp | 0.5 bpp | 1.0 bpp |
|---|---|---|---|
| EZW | 26.77 dB | 30.53 dB | 35.14 dB |
| AGP | 27.81 dB | 31.61 dB | 36.55 dB |
| SPIHT | 27.58 dB | 31.40 dB | 36.41 dB |
| SPECK | 27.76 dB | 31.54 dB | 36.49 dB |

Fig. 6C    PSNR at various rates for Barbara (512 x 512)

| Coding method | 0.25 bpp | 0.5 bpp | 1.0 bpp |
|---|---|---|---|
| EZW | 30.31 dB | 32.87 dB | 36.20 dB |
| AGP | 30.53 dB | 33.13 dB | 36.53 dB |
| SPIHT | 30.56 dB | 33.13 dB | 36.55 dB |
| SPECK | 30.50 dB | 33.03 dB | 36.36 dB |

Fig. 6D    PSNR at various rates for Goldhill (512 x 512)

Fig. 7

EMBEDDED AND EFFICIENT LOW-COMPLEXITY HIERARCHICAL IMAGE CODER AND CORRESPONDING METHODS THEREFOR

BACKGROUND OF THE INVENTION

The present invention relates generally to image coders and/or decoders (hereinafter simply coders) and corresponding methods. More specifically, the present invention relates to an embedded and highly efficient low-complexity hierarchical image coder and corresponding methods therefor. Advantageously, a corresponding software program for converting a general-purpose computer into an embedded and highly efficient low-complexity hierarchical image coder is also disclosed.

Image coding utilizing scalar quantization on hierarchical structures of transformed images has proven to be a very effective and computationally simple technique. Shapiro was the first to describe such a technique with his Embedded Zerotree Wavelet (EZW) algorithm in his paper entitled "Embedded Image Coding Using Zerotrees of Wavelet Coefficients (IEEE Trans. Signal Processing 41, pp. 3445–3462 (December 1993)). Different variants of this technique have appeared in the literature which provide an improvement over the initial work. Said & Pearlman, in two papers entitled "An Improved Zero-tree Method for Image Compression (IPL TR-122, ECSE Dept., Rensselaer Polytechnic. Inst., Troy, N.Y. (November 1992))" and "Image Compression Using the Spatial-orientation Tree (IEEE Int. Symposium on Circuits and Systems, Chicago, Ill., pp. 279–282 (May 1993))," successively improved the EZW algorithm by extending this coding scheme. Moreover, Said & Pearlman succeeded in presenting a different implementation based on a set-partitioning sorting algorithm, as described in "A New, Fast and Efficient Image Codec Based on Set Partitioning in Hierarchical Trees (IEEE Trans. Circuits and Systems for Video Technology, vol. 6(3), pp. 243–250 (June 1996))." This new coding scheme, called the Set-Partitioning in Hierarchical Trees (SPIHT), provided an even better performance than the improved version of EZW.

It will be noted that all of these scalar quantized schemes employ some kind of significance testing of sets or groups of pixels, i.e., the set is tested to determine whether the maximum magnitude in the set is above a predetermined threshold. The results of these significance tests determine the path taken by the coder in encoding the source samples. These significance testing schemes are all based on some very simple principles which allow them to exhibit excellent performance which include, among others:

(1) the significance testing scheme provides for the partial ordering of magnitude coefficients with a set-partitioning sorting algorithm;

(2) the significance testing scheme provides for bit plane transmission in decreasing bit plane order; and (3) the significance testing scheme permits exploitation of self-similarity across different scales of an image wavelet transform.

It will also be noted that these significance testing schemes all possess relatively low computational complexity, considering the fact that their performance is comparable to the best-known image coding algorithms. This feature seems in conflict with the well-known tenets of information theory that the computational complexity of a stationary source, i.e., source sample aggregates) increases as the coding efficiency of the source increases, as discussed in the book by T. Cover and J. Thomas entitled "Elements of Information Theory (John Wiley & Sons, Inc., New York (1991))." Stated another way, these coding schemes seem to have provided a breathing space in the world of simultaneously increasing efficiency and computational complexity.

It should be mentioned that an important characteristic possessed by the class of coders discussed immediately above is that of progressive transmission and embeddedness. Progressive transmission refers to the transmission of information in decreasing order with respect to its information content. In other words, the coefficients with the highest magnitudes are transmitted first. Since all of these coding schemes transmit bits in decreasing bit plane order, this ensures that the transmission is progressive. Such a transmission scheme makes it possible for the bitstream to be embedded, i.e., a single coded file can used to decode the image at various rates less than or equal to the coded rate, to give the best reconstruction possible with the particular coding scheme.

With these desirable features of excellent performance and low complexity, along with other characteristics such as embeddedness and progressive transmission, it will be appreciated that these scalar quantized significance testing schemes have recently become very popular in the search for practical, fast and efficient image coders and, in fact, have become the basis for serious consideration for future image compression standards.

It will be appreciated that while the significance testing schemes employing trees permits the exploitation of the similarity across different subbands and, thus, the clustering of energy in frequency and space in hierarchical structures of transformed images, such schemes do not make use of sets in the form of blocks. It will be appreciated that block-based coding is an efficient technique for exploiting the clustering of energy found in image transforms. It is a known fact that the statistics of an image transform vary remarkably as one moves from one spatial region to another. By grouping transform source samples in the form of blocks and coding those blocks independently, one advantageously can exploit the statistics of each block in an appropriate manner. It will be noted that this is one of the reasons that block-based coders work quite well. However, there is an increasing demand for some desirable properties for image coders, such as embeddedness and progressive transmission, which are very useful and much needed in the fast-growing MultiMedia and networking environment markets. Both the SWEET and the AGP block-processing algorithms, which are discussed below, are very efficient but do not possess these desirable properties.

What is needed is a low-complexity hierarchical image coder and corresponding methods for coding/decoding blocks wherein the signal is completely embedded. Moreover, what is needed is a low-complexity hierarchical image coder and corresponding methods which employ progressive transmission. Furthermore, a low-complexity hierarchical image coder and corresponding method which have low dynamic memory requirements would be extremely desirable, particularly when the low-complexity hierarchical image coder is to be employed as a discrete module in a device having limited computing power. Lastly, a low-complexity hierarchical image coder and corresponding method which can be employed for both lossy and lossless compression would be particularly advantageous.

SUMMARY OF THE INVENTION

Based on the above and foregoing, it can be appreciated that there presently exists a need in the art for an embedded and highly efficient low-complexity hierarchical image coder and corresponding method which mitigates the above-described deficiencies. The present invention was motivated by a desire to overcome the drawbacks and shortcomings of the presently available technology, and thereby fulfill this need in the art.

One aspect according to the present invention is provided by a method for use in encoding an decoding a data set corresponding to an image. Preferably, the method includes a first subroutine for partitioning the data set into first and second sets, for adding the first set into a list of insignificant sets (LIS), and for initializing a list of significant pixels (LSP), a second subroutine for testing the first and second sets for significance with respect to a threshold value, partitioning significant members of the first and second sets in accordance with first and second partitioning functions, respectively, and adding significant pixels to the LSP, a third subroutine for refining the quantization of the pixels in the LSP, and a fourth subroutine for decrementing the threshold value. It will be appreciated that the term image encompasses a sequence of images which vary over time. Preferably, the second, third and fourth subroutines are repeated until encoding/decoding of the data set has been completed. Most preferably, the second, third and fourth subroutines are repeated until one of the encoding/decoding of the data indicative of the lowest bit plane has been completed or the bit budget has been spent. Additionally, the fourth subroutine advantageously can include a routine for entropy coding a significance map generated in accordance with the second and third subroutines.

Another aspect according to the present invention is provide by a coder for use in encoding and decoding a data set corresponds to an image, which includes a first device for partitioning the data transformation into first and second sets, for adding the first set into a list of insignificant sets (LIS), and for initializing a list of significant pixels (LSP), a second device for testing the first and second sets for significance with respect to a threshold value, partitioning significant members of the first and second sets in accordance with first and second partitioning functions, respectively, and adding significant pixels to the LSP, and a third means for refining the quantization of the pixels in the LSP. Preferably, the second and third devices are employed seriatim as the threshold value is decremented until encoding/decoding of the data set has been completed. In addition, the coder can include a fourth device for entropy coding a significance map cooperatively generated by the second and third devices.

A still further aspect according to the present invention is provided by a recording medium storing computer readable instructions for converting a general purpose computer into an hierarchical image coder, wherein the image coder is a low-complexity image coder which generates a selectively embedded bit stream suitable for progressive transmission. Preferably, the computer readable instructions permit the general purpose computer to repeatedly store and release data representing blocks of a image being encoded to thereby permit the hierarchical image coder to process an image larger in size than available coder computer memory.

Another aspect according to the present invention provides a recording medium storing computer readable instructions for converting a general purpose computer into an hierarchical image decoder, wherein the image decoder is a low-complexity image decoder which reconstructs an image from a selectively embedded bit stream transmitted by progressive transmission. Preferably, the computer readable instructions permit the general purpose computer to repeatedly store and release data representing blocks of an image being decoded to thereby permit the hierarchical image coder to reconstruct an image larger in size than available decoder computer memory.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which:

FIG. 6A is a graph comparing the results achieved using the SPECK algorithm with those of other algorithms, while

DETAILED DESCRIPTION OF THE PREFERRED EMBODIMENTS

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The image coding algorithm according to the present invention, which hereinafter will be referred to as the Set Partitioned Embedded bloCK coder (SPECK) algorithm, can be said to belong to this class of scalar quantized significance testing schemes. Thus, the SPECK algorithm has its roots primarily in the ideas developed in the Set Partitioning in Hierarchical Trees (SPIHT), Alphabet & Group Partitioning (AGP) and SWEET image coding algorithms. The AGP algorithm was first disclosed in the paper by A. Said and W. Pearlman entitled "Low-complexity Waveform Coding via Alphabet and Sample-set Partitioning (Visual Communications and Image Processing '97, Proc. SPIE 3024, pp. 25–37 (February 1997))." The SWEET algorithm was described in the article by J. Andrew entitled "A Simple and Efficient Hierarchical Image Coder (ICIP 97, IEEE Int'l Conf. on Image Proc. 3, pp. 658, Paper No. 573 (1997))." It will be appreciated that the SPECK algorithm is different from SPIHT and SWEET in that it partitions blocks, not trees, and is different from AGP in that it is embedded. The main idea is to exploit the clustering of energy in frequency and space in hierarchical structures of transformed images.

A more detailed discussion of the SPECK algorithm with respect to these other algorithms, and coders employing the same, is given immediately below. However, it should first be mentioned at this point that the SPIHT and AGP algorithms are fully described, respectively, in U.S. Pat. No. 5,764,807, which is entitled Data Compression Using Set Partitioning in Hierarchical Trees, and which issued to W. A. Pearlman and A. Said on Jun. 9, 1998, and U.S. Pat. No. 5,959,560, which is entitled Data Compression via Alphabet Partitioning and Group Partitioning, and which issued to A. Said and W. A. Pearlman on Sep. 28, 1999. It should also be mentioned that both of the above-mentioned patents are incorporated in their entirety by reference.

The SPECK algorithm was motivated by the desire to provide a single algorithm having all of the features discretely apparent from analysis of the SPIHT, SWEET and AGP algorithms. However, although the SPECK algorithm employs ideas from all of these coding schemes, the SPECK algorithm is different from these coders in various respects. In particular, the SPECK algorithm according to the present invention is a new image compression algorithm that is a novel synthesis of the AGP and SPIHT algorithms, particularly with respect to embedded coding, i.e., a single bit stream that allows progressive decoding of lower rate images by repeated truncation. It will be appreciated that this capability is important for delivery of different quality services to different users from a single encoding operation.

In contrast, AGP works on the principle of recursive quadrature splitting of significant sub-blocks, where a sub-block is significant if its maximum value equals that of the four sub-blocks; otherwise, it is insignificant. In other words, AGP partitions blocks and encodes subblock maxima. A redefinition of maximum value as the deepest significant bit (floor ($\log_2$(maximum value)), and progressively decrementing the global deepest significant bit by one enables bit-plane embedded coding. In contrast, the SPECK algorithm employs the same lists, i.e., a list (LIS) consisting of insignificant sets of points, a list (LSP) consisting of significant points and a list (LIP) consisting of insignificant points to store pointers to insignificant pixels, insignificant sets (blocks), and significant pixels, respectively. However, as discussed below, LIP and LIS are combined in the SPECK algorithm in a way that retains the functionality of separate lists. The order in which pixels are tested, distributed to these lists, and found significant is duplicated at the decoder, so that bit planes of significant pixels are decoded in a progression from highest to lowest bit planes until the bit budget is spent. The creation of the above-mentioned lists in the encoder is enabled by the binary outcomes of the significance tests, which are sent to the decoder where they are duplicated.

Before discussing the SPECK algorithm in detail, it should be mentioned that U.S. Pat. No. 5,748,116, which is entitled System and Method for Nested Split Coding of Sparse Data Sets, and which issued to C. K. Chui and R. Yi on May 5, 1998, describes a coding algorithm called NQS, which also employs a quadrature splitting method. NQS uses the so-called deepest bit paradigm, but without subsequent coding, and does not produce an embedded bit stream. Moreover, the NQS algorithm does not employ lists by which the sets are sorted and ordered. It should be mentioned that AGP is much more general, as it includes methods to encode the significance bits.

As discussed above, the SPECK algorithm combines aspects of AGP, which is non-embedded, and which works on a quadtree with intermediate nodes associated with sets and only leaf nodes with pixels, with SPIHT, which is embedded, and which works on spatial-orientation trees, which are quadtrees having a different structure, i.e., having intermediate nodes associated with pixels or sets. Unlike any of the algorithms discussed above, the SPECK algorithm partitions the sets in increasing size to obtain a finer scale of embeddedness and, thus, more efficient compression. Whereas SPIHT is a tree-based fully embedded coder which employs progressive transmission by coding bit planes in decreasing order, the AGP and SWEET coding algorithms are block-based coders which are not embedded and do not employ progressive transmission.

With respect to the SPIHT algorithm, SPIHT works by grouping pixels together in the form of spatial orientation trees. It is well known that a subband pyramid exhibits similarities across its subbands at the same spatial orientation. The SPIHT algorithm exploits this characteristic of the image transform by grouping pixels together into such structures.

The AGP algorithm, on the other hand, is a block-based coding algorithm which partitions the image transform in the form of blocks. The blocks are recursively and adaptively partitioned such that high energy areas are grouped together into small sets whereas low energy areas are grouped together in large sets. Such a type of adaptive quadtree partitioning results in efficient coding of the source samples. It should be mentioned that the AGP algorithm is a block entropy coder which first reduces the alphabet of the image transform to a tractable level. The AGP algorithm then partitions the image transform in the form of blocks and codes those blocks using a powerful entropy coding method.

The SWEET coding algorithm is also block based and uses octave-band partitioning to exploit the pyramidal structure of image transforms. SWEET codes a block up to a certain bit-depth, $n_{min}$, before moving onto the next one. Different rates of compressed images are obtained by appropriately choosing the minimum bit-plane, $n_{min}$, to which to encode. Finer sets of compression ratios are obtained by scaling the image transform by some factor prior to the coefficient coding.

As mentioned above, block-based coding is an efficient technique for exploiting the clustering of energy found in image transforms because the statistics of an image transform vary remarkably as one moves from one spatial region to another. Thus, by grouping transform source samples in the form of blocks and then coding those blocks independently, one advantageously can exploit the statistics of each block in an appropriate and advantageously manner. Since there is an increasing demand for some desirable properties for image coders, such as embeddedness and progressive transmission, and since both SWEET and AGP, although very efficient, do not possess these desirable properties, a different block-based coding algorithm would be particularly advantageous.

The SPECK coding algorithm solves this problem by exhibiting the above-mentioned important properties, which are lacking in most, if not all, block-based coding algorithms. First, the SPECK algorithm provides a fully embedded block-based coder which employs progressive transmission by coding bit planes in decreasing order. Second, the SPECK algorithm employs the octave-band partitioning of SWEET to exploit the hierarchical structure of the subband pyramid and concentrate more on potentially high energy subbands. Thirdly, the SPECK algorithm employs the adaptive quadtree splitting methodology associated with the AGP algorithm to zoom into high energy areas within a region and to subsequently code these areas with minimum significance maps. Moreover, the SPECK algorithm employs the significance map schemes of EZW and SPIHT to code the image transform progressively in decreasing bit-plane order. All of these features make SPECK a very efficient block-based embedded image coding algorithm.

In the discussion that follows, a brief outline of the SPECK coding scheme and an explanation of the terminology used in connection with the SPECK algorithm will first be presented. Thereafter, a detailed explanation of the SPECK algorithm will be provided.

Figure 1:
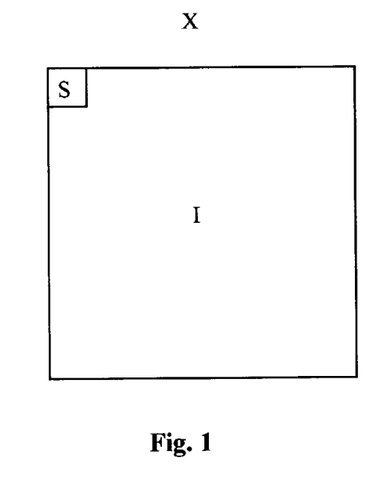
FIG. 1 illustrates transforming f an image X into sets S and I.

Referring to FIG. 1, consider an image X which has been adequately transformed using an appropriate data transformation, e.g., by employing the discrete wavelet transform. The transformed image can be said to exhibit a hierarchical pyramidal structure defined by the levels of decomposition, with the topmost level being the root. The finest pixels lie at the bottom level of the pyramid while the coarsest pixels are found at the top (root) level. The image X advantageously can be represented by an indexed set of transformed coefficients $\{c_{ij}\}$, located at pixel position (i,j) in the transformed image.

Preferably, these pixels are grouped together in sets which comprise regions in the transformed image. Following the methodology associated with the SPIHT algorithm, it can be said that a set T of pixels is significant with respect to n if $$\max_{(i,j)\in T} \{|c_{i,j}|\} \geq 2^n$$

otherwise it is insignificant. Moreover, the significance of a set T can be defined as a function of n and the set T, i.e., $$S_n(\tau) = \begin{cases} 1, & \text{if } 2^n \leq \max_{(i,j)\in \tau} |c_{i,j}| < 2^{n+1} \\ 0, & \text{else} \end{cases}$$

It should be mentioned that the SPECK algorithm makes use of rectangular regions of image. These regions or sets, which will henceforth be referred to as sets of type S, advantageously can vary dimensionally. In other words, the dimension of a set S depends on the dimension of the original image and the subband level of the pyramidal structure at which the set lies.

Moreover, the size of a set can be defined to be the cardinality C of the set, i.e., the number of elements (pixels) in the set, as:

$$\text{size}(S)=C(S)\equiv |S|$$

During the execution of the SPECK algorithm, sets of various sizes will be formed, depending on the characteristics of pixels in the original set. It will be noted that a set of size 1 consists of just one pixel. The other type of sets used in the SPECK algorithm are referred to as sets of type I. These sets are obtained by chopping off a small square region from the top left portion of a larger square region, as illustrated in FIG. 1.

It should also be mentioned that during execution of the SPECK algorithm two linked lists, i.e., LIS—List of Insignificant Sets, and LSP—List of Significant Pixels, are maintained. The former list contains the sets of type S of varying sizes which have not yet been found significant against a predetermined threshold n. In contrast, the latter list advantageously contains those pixels which have tested significant against the predetermined threshold n. Alternatively, as will become obvious later on, an array of smaller lists of type LIS, each containing sets of type S of a fixed size, advantageously can be employed instead of using a single large list having sets S of varying sizes. It will be appreciated that the use of multiple lists will speed up the encoding/decoding process.

As mentioned immediately above, the SPECK algorithm employs use of only two lists, LIS and LSP, unlike SPIHT which makes use of an additional list, LIP, that stores insignificant coefficients. It will be appreciated that the contents of both LIS and LIP are integrated into a single list LIS in the SPECK algorithm. Hence, when reference is made to the list LIS in this algorithm, it will be recognized that both the insignificant sets and insignificant coefficients are being referred to. The motivation behind the use of a single list LIS in the SPECK algorithm is functionally similar to maintaining separate lists, LIS and LIP, as in SPIHT. The idea behind the strategy of processing sets in increasing order of their size is that during the course of its execution, the algorithm sends those coefficients to LIS whose immediate neighbors have tested significant against some threshold n but they themselves have not tested significant against that particular threshold. Chances are, because of energy clustering in the transform domain, that these insignificant coefficients would have magnitudes close to the magnitudes of their neighboring coefficients already tested significant, although lesser. In short, it is likely that these coefficients will test positive to some nearby lower threshold and add to the reduction in the overall distortion of the coded image.

Having established and defined the terminology will be employed in discussing the SPECK coding method, the SPECK algorithm will now be described in detail.

Figure 2A:
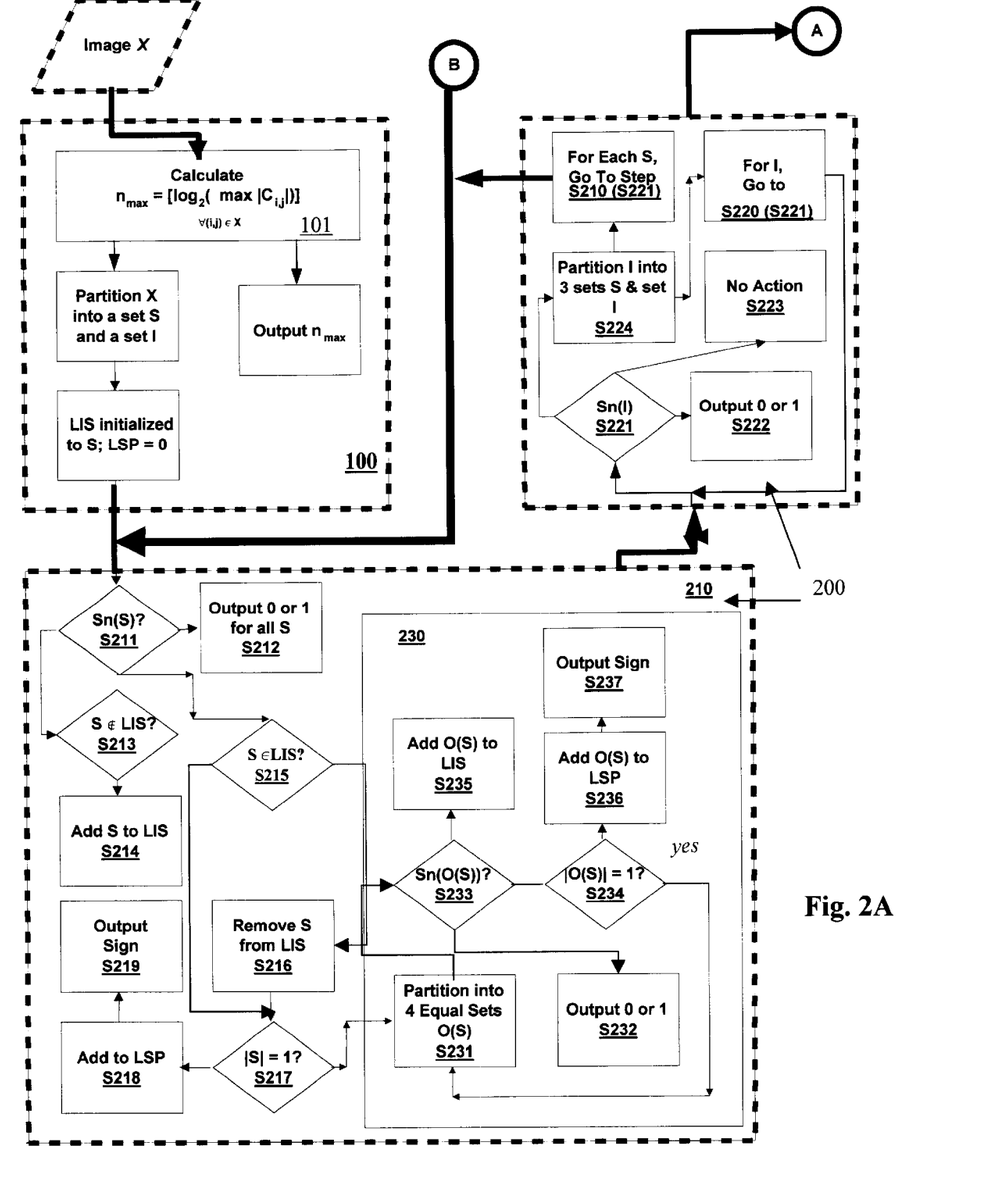
FIGS. 2A and 2B collectively forma high-level block diagram of the four subroutines executed in the SPECK algorithm according to the present invention.
Figure 2B:
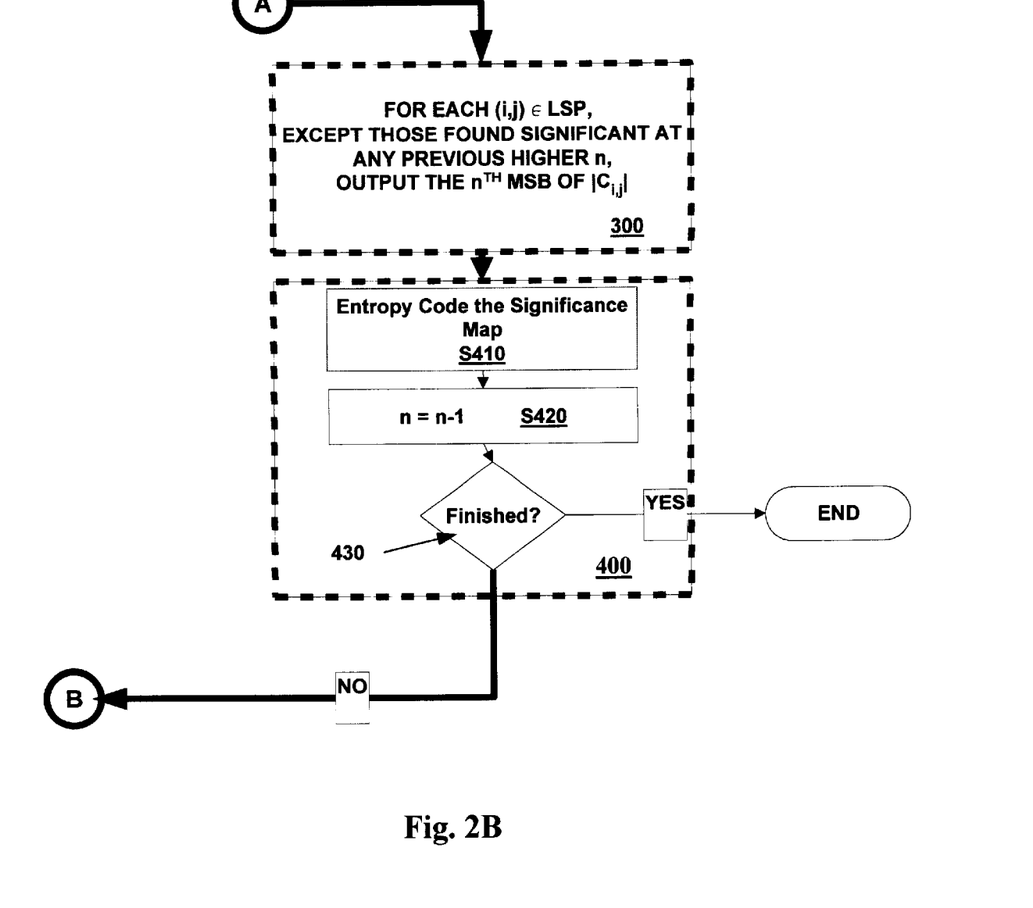

The SPECK coding algorithm is illustrated in FIGS. 2A and 2B. As will be appreciated from these figures, the actual SPECK algorithm consists of an initialization subroutine 100, a partitioning subroutine or pass 200, a refinement subroutine or pass 300, and the quantization subroutine 400. FIGS. 3A–3D illustrate, in pseudocode listing, the specific functions called during performance of the subroutines 100, 200, 300, and 400. These four functions are ProcessS( ), CodeS( ), ProcessI( ), and CodeI( ) in FIGS. 3A–3D.

The detailed working of the SPECK algorithm presented in FIGS. 2A and 2B will now be described. It will be noted that the starting source for the SPECK algorithm is a rectangular image X that has undergone an appropriate data transformation. As illustrated in FIG. 1, the image X consists of transformed coefficients $\{c_{ij}\}$, located at pixel position (i,j). It will be appreciated that such an image exhibits a hierarchical pyramidal structure having subbands at different levels of its decomposition. The topmost band is referred to as the root of the pyramid.

The SPECK algorithm subroutine 100 starts by calculating the value $n_{max}$ during step S101, which value is then output to a memory device or a communications channel, as discussed below, during step S102. It will be appreciated that the maximum threshold $n_{max}$ is the value which satisfies the criteria $c_{ij}$ is insignificant with respect to $n_{max}+1$, $\forall c_{ij} \in X$, but is significant against the threshold $n_{max}$, for some $c_{ij} \in X$. Then, the data representing the image X is formed into sets by partitioning the transform corresponding to the image into two sets, i.e., a set S, which is the root of the pyramid, and a set I, which is everything that is left of the image after taking out the root (see FIG. 1), during step 103. During step S104, set S is initialized LIS and LSP is set equal to 0.

Figure 3A:
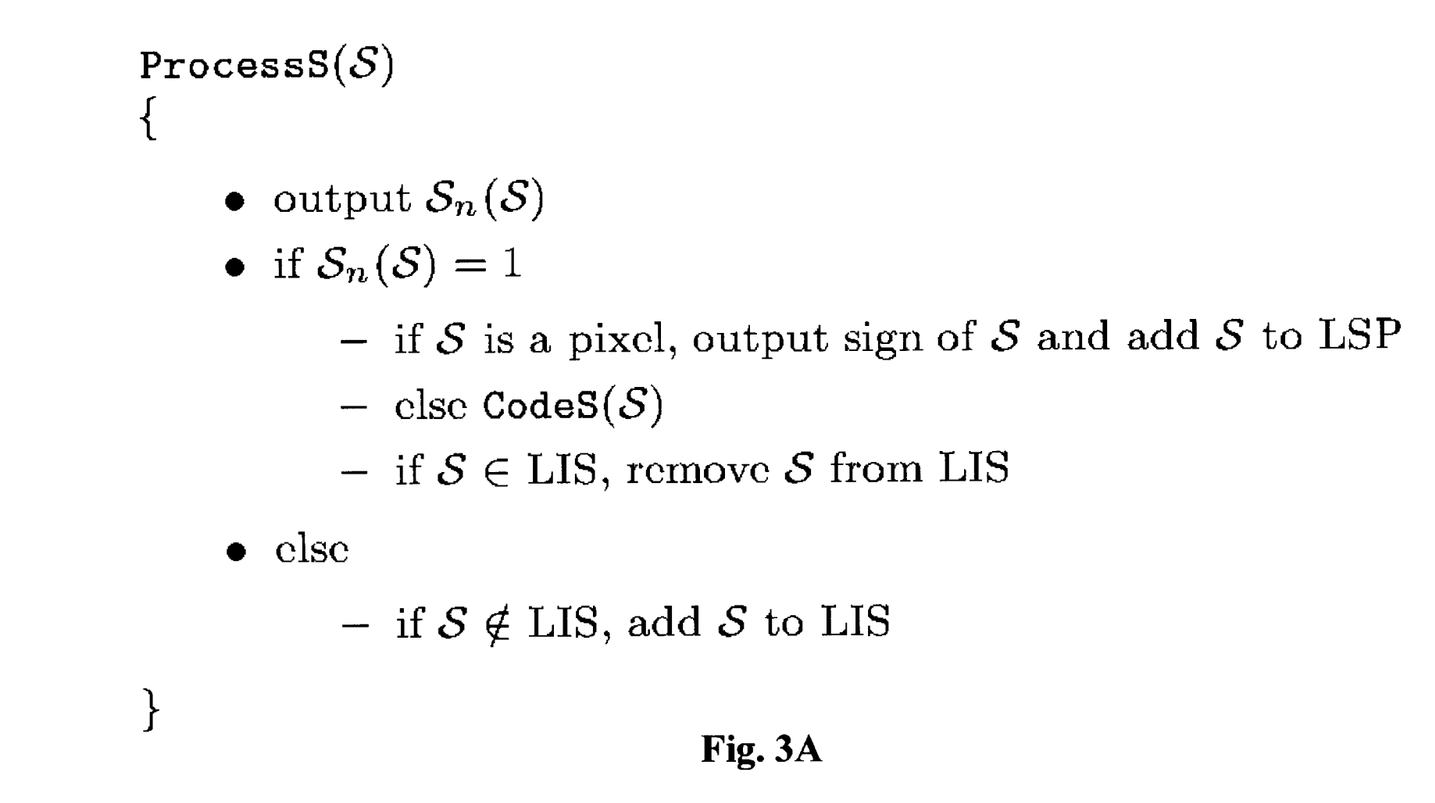
FIGS. 3A–3D are exemplary pseudocode listings of the functions called during execution of the subroutines illustrated in FIGS. 2A and 2B.
Figure 3B:
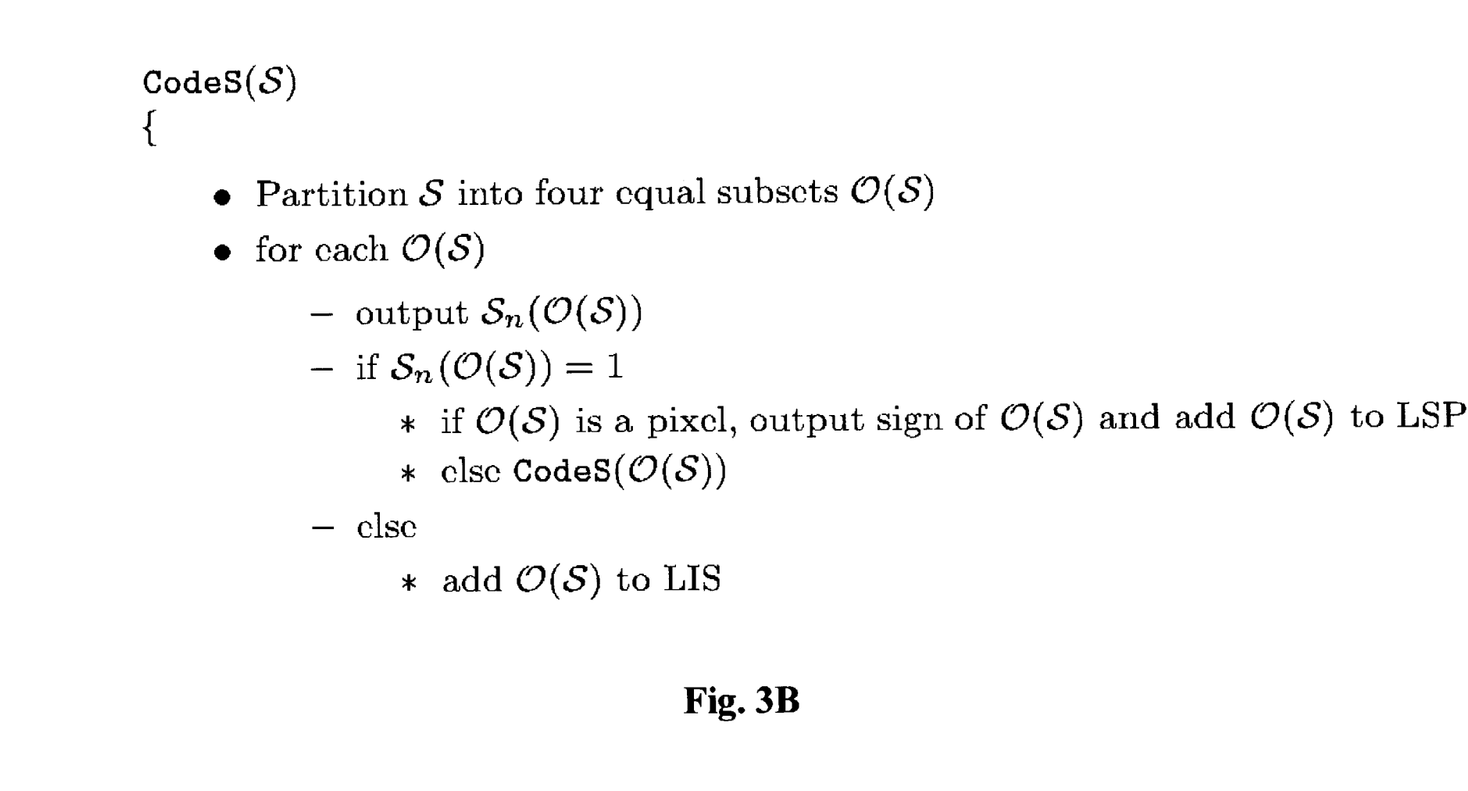
Figure 4:
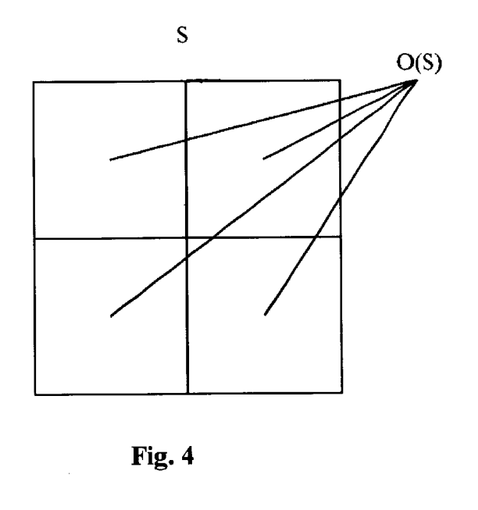
FIG. 4 is useful in understanding the concept of quadtree partitioning a set S into four subsets.

During the partitioning subroutine 200, the SPECK algorithm performs quadtree partitioning of the image. More specifically, during step S210, set S in LIS is processed by testing it for significance against the threshold n in accordance with the function labeled ProcessS(S), which is illustrated in FIG. 3A. Assuming that set S is significant, it is partitioned, by a quadtree partitioning process, into four subsets O(S), each having a size approximately one-fourth the size of the parent set S in accordance with the function labeled CodeS(S), as illustrated in FIG. 3B. FIG. 4 illustrates this particular partitioning process.

More specifically, during step S211, the set S is tested to see if it is significant or not. If S is not significant, indicated by a value of 0, S is then tested to determine whether S is not an element of LIS during step S213. If the answer is true, S is added to LIS. If the determination in step S 211 is that is S is significant, a test is performed to determine if S is included in LIS. If the answer is negative, the subroutine jumps to the input of step S217. When the answer is YES, S is removed from LIS during step S216 and a further test is performed to determine whether the size of S corresponds to a pixel during step S217. If the answer is YES, S is added to LSP during step S218 and the sign is output to, for example, the communications channel during step S219. If the answer is NO, the subroutine 230 is executed, i.e., the routine CodeS(S) illustrated in FIG. 3B is executed. In either case, the determination made during step S211 is output during step S212.

During subroutine 230, the set S is partitioned into four equal sets O(S) during step S231. Each set O(S) is ten tested to determine whether or not it is significant during step S233. In either case, the determination result is output to the communications channel during step 232. If the O(S) is not significant, O(S) is added to LIS during step S235. If O(S) is significant, the size of O(S) is determined during step S234. When O(S) is equal in size to a pixel, O(S) is added to LSP during step S236 and the sign is output to the communications channel during step S237. When O(S) is larger than one pixel, the subroutine 230 is repeated.

Thus, each of these four subsets is treated, in turn, as a set of type S and processed recursively until the pixel-level is reached where all of the pixels that are significant in the original set S are located and thereby coded. It should be noted that the pixels/sets that are found to be insignificant during this 'hunting' process are added to LIS to be tested against the next lower threshold during a subsequent stop in the SPECK algorithm. The motivation for quadtree partitioning of such sets is to rapidly focus on the areas of high energy in the set S and code these areas first. An equally important motivation for quadtree partitioning of such sets is identify large insignificant regions, which are relatively common in image transforms, since insignificant sets at a threshold n corresponding to such regions advantageously can be specified by a single bit.

Figure 3C:
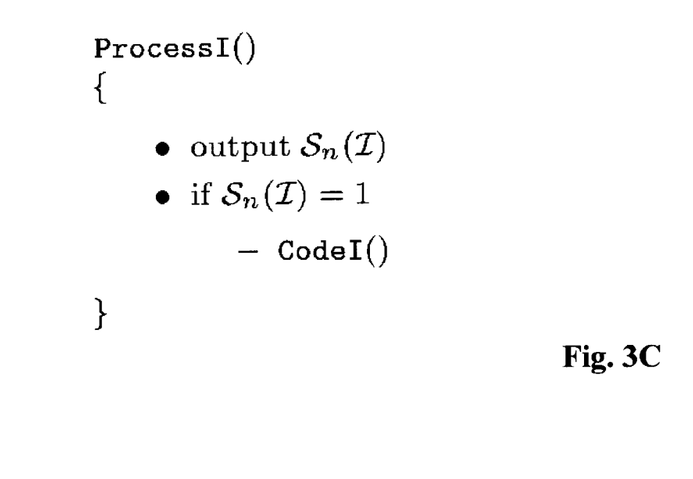
Figure 3D:
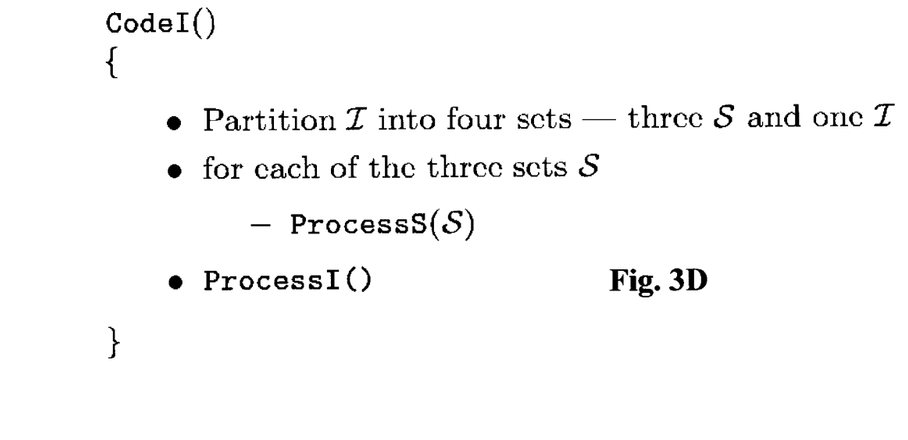
Figure 5:
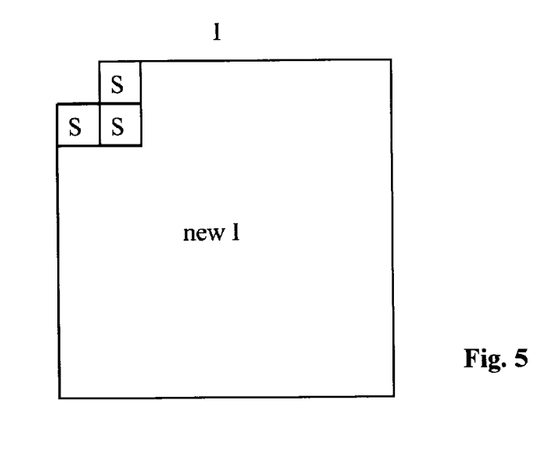
FIG. 5 finds use in understanding the concept of partitioning a set I into four new sets.

At this stage in the execution of the SPECK algorithm, there are no more sets of type S that need to be tested against the threshold n. It will be appreciated from the discussion above that if there were untested sets of the type S, these sets would be processed before going on to the next part of the SPECK algorithm. Thus, once all sets of type S are processed, the set I is processed by testing it against the same threshold n in accordance with a function labeled ProcessI (S), which is illustrated in FIG. 3C, during subroutine 220. If the set I is found to be significant, the set I is partitioned by yet another partitioning scheme, i.e., octave band partitioning. FIG. 5 illustrates this partitioning scheme. Set I is partitioned into four sets, i.e., three sets of type S and one set of type I in accordance with the function labeled CodeI(S), which is illustrated in FIG. 3D. It should be mentioned that the size of each of these three sets S is the same as that of the chopped portion of X. The new set I that is formed by this partitioning process is thus reduced in size.

More specifically, for each I, a test is performed to determine if I is significant during step S221. The results of this determination are output to the communications channel during step S222. If I is not significant, no further action is taken, and the next I is checked for significance during step S223. If I is significant, I is partitioned into three S-type sets and a new set I during step 224. For each S, the subroutine jumps back to S211, the start of subroutine 210. For each I, the subroutine 220 is repeated, i.e., the subroutine jumps back to the start of step S231.

It should be mentioned at this point that the principle behind this partitioning methodology is exploitation of the hierarchical pyramidal structure of the subband decomposition, where it is more likely that the energy is concentrated at the top most levels of the pyramid and, as one goes down the pyramid, the energy content decreases gradually. Thus, if a set I is significant against some threshold n, it is more likely that the pixels that cause I to be significant lie in the top left regions of the set I. These regions are decomposed into sets of type S, and are put next in line for processing.

In this way, regions that are likely to contain significant pixels are grouped into relatively smaller sets and processed first, while regions that are likely to contain insignificant pixels are grouped into a large set. Advantageously, a single bit may be enough to code this large region against the particular threshold. Hence, once the set I is partitioned by the octave band partitioning method, the three sets S are processed in the regular image-scanning order, after which the newly formed reduced set I is processed.

It should be noted that processing the set I is a recursive process, and depending on the characteristics of the image, at some point in the algorithm, the set I will cover only the lowermost (bottom) level of the pyramidal structure, as indicated with respect to step S230. When, at this point, the set I tests significant against some threshold, it will be broken down into three sets S but there will be no new reduced set I. To be precise, the new set I will be an empty set. Hence, the functions ProcessI(S) and CodeI(S) will have no meaning in the SPECK algorithm after this event.

It should also be mentioned that an important step in the execution of the partitioning pass comes after the first run of the algorithm. Once one pass has occurred, sets of type S of varying sizes are added to LIS. During the next lower threshold, these sets are processed in a particular order. The list LIS is not traversed sequentially for processing sets S; rather, the sets are processed in increasing order of their size. In other words, say for a square image, sets of size 1 (i.e., pixels) are processed first, sets of size 4 (blocks of 2×2 pixels) are processed next, and so on.

The idea behind this strategy is that during the course of its execution, the SPECK algorithm sends those pixels to LIS whose immediate neighbors have tested significant against some threshold n but they themselves have not tested significant against that particular threshold. Chances are, because of energy clustering in the transform domain, that these insignificant pixels would have magnitudes close to but less that the magnitudes of their neighboring pixels already tested significant. Thus, it is likely that these pixels will test positive to some nearby lower threshold and add to the reduction in the overall distortion of the coded image.

Moreover, the overhead involved in testing a single pixel and moving it to LSP is much lower than that involved in testing a group of pixels and moving the significant ones in it to LSP. Of course, if a whole partitioning pass is completed, this scheme offers no advantage since all the sets of type S in LIS would be tested in either case. However, if the coding algorithm were to stop in the middle of a partitioning pass, as it might if the desired rate is achieved, and the sets in LIS are processed in increasing order of their size, then the SPECK algorithm will provide a significant performance improvement.

It may seem that processing sets of type S in increasing order of their size involves a sorting mechanism, something which is not desirable in fast implementation of coders. However, there is a simple way of completely avoiding this sorting procedure.

Note that the way sets S are constructed, they lie completely within a subband. Thus, every set S is located at a particular level of the pyramidal structure. Partitioning a set S into four offsprings O(S), i.e., forming sets S of a new reduced size, is equivalent to going down the pyramid one level to a correspondingly finer resolution. Hence, the size of a set S for an arbitrary image corresponds to a particular level of the pyramid. Advantageously, the SPECK algorithm employs an array of lists, each corresponding to a level of the pyramid, i.e., each list stores sets of a fixed size. Processing the lists in an order which corresponds to increasing size of sets completely eliminates the need for any sorting mechanism for processing the sets S. Thus, the SPECK algorithm does not need to compromise the speed of the algorithm by employing some kind of sorting mechanism.

It should be noted that using an array of lists does not increase the memory requirements for the coder, as opposed to using a single list. This is because the total number of sets S that are formed during the coding process remain the same. Instead of storing these sets in one large list, we are storing them in several smaller lists with the aim of speeding up the coding process.

Once all the sets S and I have been processed, the partitioning subroutine 200 for that particular threshold n is completed, after which the refinement subroutine 300 is initiated. The subroutine 300 refines the quantization of the pixels in LSP, i.e., those pixels which were tested significant during the previously executed partitioning subroutine 200. It should be mentioned that once the subroutine 300 has been performed, the threshold n is lowered and the sequence of partitioning and refinement subroutines 200 and 300 is repeated against this lower threshold n. This process is repeated until the desired rate is achieved or, in case of lossless or nearly lossless compression, all the thresholds up to the last, corresponding to threshold n=0, are tested.

Further quantization, and possibly entropy coding of significance map using arithmetic coding with simple context-based models, is then performed during subroutine 400. Moreover, during step S420, the threshold n is decremented by one and this threshold is examined during step S430 to determine whether or not the n has fallen below $n_{min}$ or the bit budget has been exhausted. If n is not below $n_{min}$, subroutines 200 and 300 are repeated. If the threshold is below $n_{min}$, the SPECK algorithm ends.

The performance of the SPECK algorithm according to the present invention was determined with respect to several monochrome, 8 bpp, 512×512 images. In each case, 5-level pyramids constructed with the 9=7 tap biorthogonal filters were employed. Moreover, the images were pre-processed using a reflection extension at the image edges. It will be noted that the bit rates are calculated from the actual size of the compressed files. Since the codec is embedded, the results for various bit rates are obtained from a single encoded file.

Figure 6A:
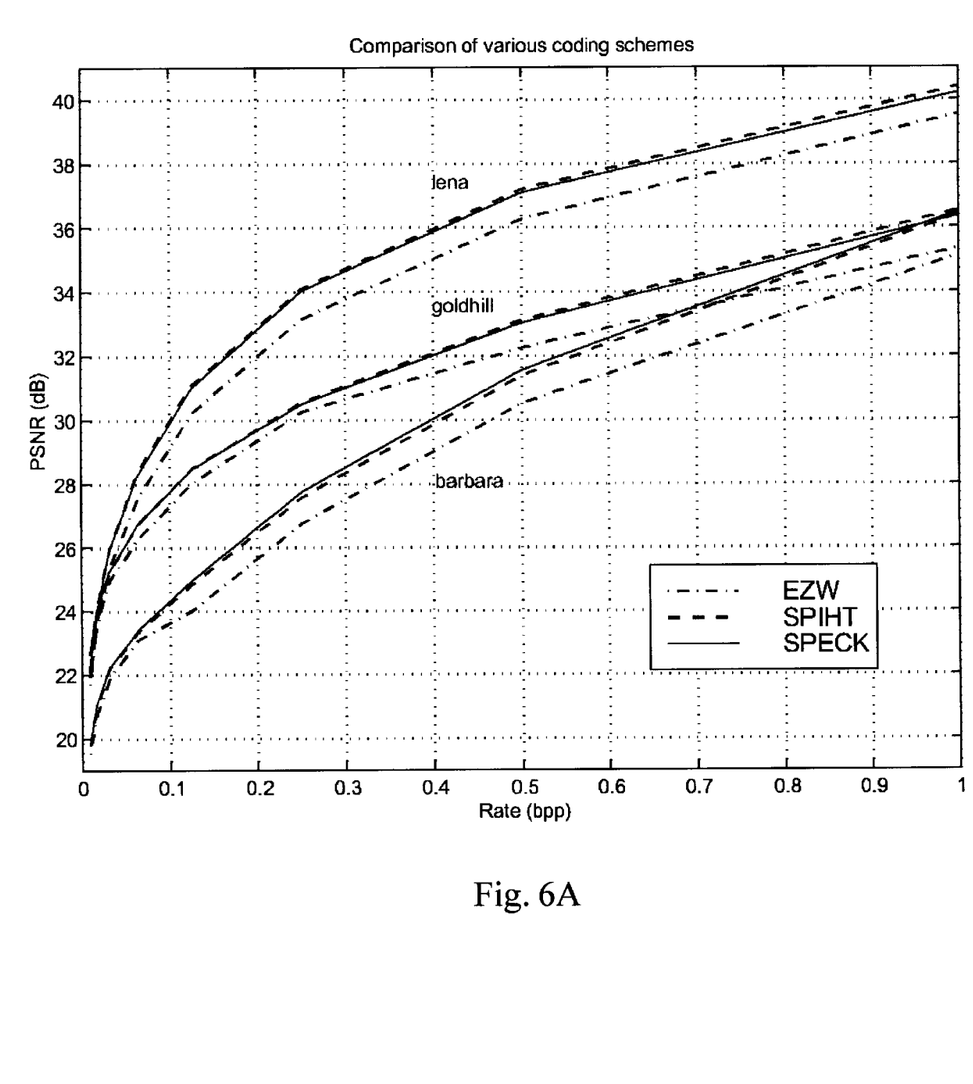
Figure 6B:
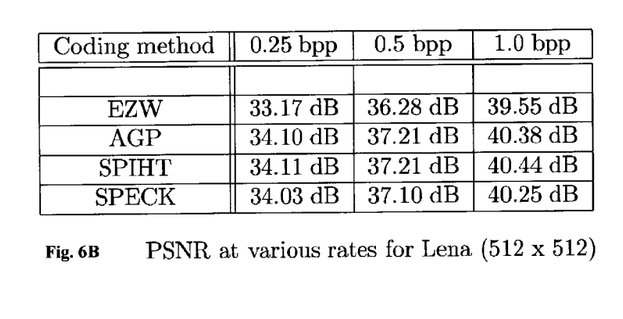
FIGS. 6B–6D are tables mapping performance to respective standard test images.
Figure 6C:
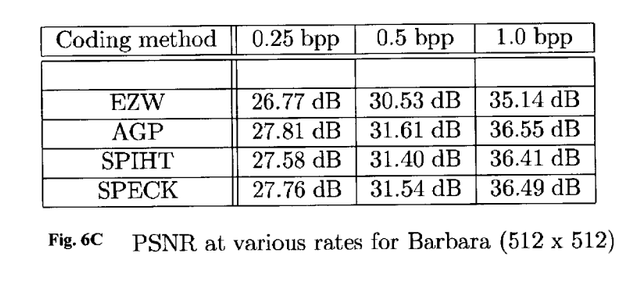
Figure 6D:
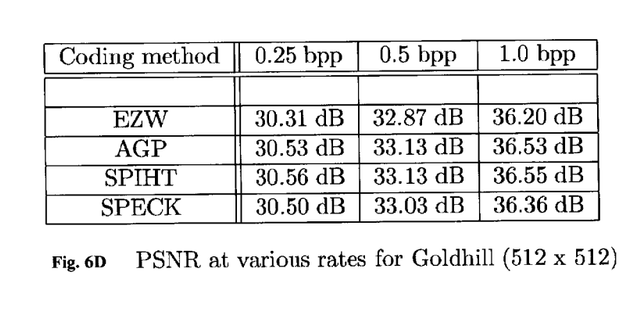

FIGS. 6A–6D show the PSNR obtained by this coding method at the rates 0.25, 0.5 and 1.0 bpp for the three images 'Lena', 'Barbara' and 'Goldhill'. These results are obtained by entropy-coding the bits put out by the coding scheme. Similar results are also included for the EZW, SPIHT and AGP coding schemes, which also employ entropy coding of the significance map. In particular, FIG. 6A presents the rate-distortion curves for the three images at rates up to 1 bpp while FIGS. 6B–6D present these comparisons in tabular form. The results are of the same nature as mentioned above for the three coding schemes. It will be appreciated from the numerical results, the SPECK coding scheme provides excellent results, comparable to the popular image coding schemes, such as SPIHT. For some images, such as Barbara, the SPECK algorithm actually gives slightly better performance than SPIHT.

Referring back to the discussion of the SPECK algorithm, it will be appreciated that in the function CodeS(S), the significance test results of the four subsets O(S) of set S are not coded separately. Rather, they are all first coded together before further processing of the subsets. The SPECK algorithm employs conditional coding for coding the significance test result of this four-subset group. In other words, the significance test result of the first subset is coded without any context, while the significance test result of the second subset is coded using the context of the first coded subset, and so on. In this way, previously coded subsets form the context for the subset being currently coded.

Also, it should be mentioned that the SPECK algorithm makes use of the fact that if a set S is significant and its first three subsets are insignificant, then this ensures that the fourth subset is significant and, thus, the SPECK algorithm does not have to send the significance test result of the last subset. This fact advantageously can be utilized in reducing the bit budget. Results have shown that because of the nature of energy clustering in the pyramidal structure, the number of scenarios of the above-mentioned type occur slightly more if the four-group subsets are coded in reverse-scanning order than in the usual forward-scanning order. This saves some overhead in bit budget and provides corresponding gains.

It should be mentioned that the decoder employs the same methodology as the encoder. In other words, the decoder receives significance test results, e.g., output during steps S212, S219, S232, S237, and S222, as a coded bitstream and reconstructs the same list structure produced by the encoder during the execution of the SPECK algorithm. It will be appreciated that the value $n_{max}$ is received by the decoder rather than calculated. Hence, the decoder advantageously can follow the same execution paths for the significance tests of the different sets and, thus, reconstructs the image progressively as the algorithm proceeds.

In summary, the SPECK image coding method has all the properties characteristic of scalar quantized significance testing schemes. In particular, the SPECK method exhibits the following properties:

It is completely embedded—a single coded bitstream can be used to decode the image at any rate less than or equal to the coded rate, to give the best reconstruction of the image possible with the particular coding scheme.

It employs progressive transmission—source samples are coded in decreasing order of their information content.

It has low computational complexity—the algorithm is very simple, consisting mainly of comparisons, and does not require any complex computation.

It has low dynamic memory requirements—at any given time during the coding process, only one connected region (lying completely within a subband) is processed. Once this region is processed, the next region is then considered for processing.

It has fast encoding/decoding—this is due to the low-complexity nature of the algorithm.

It has efficient performance—its efficiency is comparable to the other low-complexity algorithms available today.

It can be used for lossy and lossless compression—depending on the choice of the transform, the algorithm can be used for lossless or nearly lossless coding, apart from lossy coding.

It will be appreciated that image compression is used almost everywhere where images are stored and/or transmitted. Applications include, but are not limited to Internet image transmission, digital photography, telemedicine, particularly teleradiology, and PACS medical workstations. The SPECK algorithm is applicable to all of the foregoing applications, as well as to remote sensing, cartography, printing, and scanning equipment.

Although the techniques of the present invention have been described herein with respect to image processing, other forms of data may be processed. Any data set that may be transformed through subband decomposition may subsequently have the transform coefficients coded for transmission and/or storage using the disclosed techniques. For example, a digitized audio segment may be decomposed into frequency subbands and encoded as described herein. It will be appreciated that the audio subband blocks (sequences) are recursively partitioned into two subblocks to form a binary tree (bintree) structure instead of the quadtree structure employed with two-dimensional data sources. Furthermore, the coding techniques of the present invention may be applied to various types of subband decompositions with their associated filter(s), e.g., to coding discrete cosine transform (DCT) blocks used in conjunction with MPEG image processing, as discussed in greater detail below.

Figure 7:
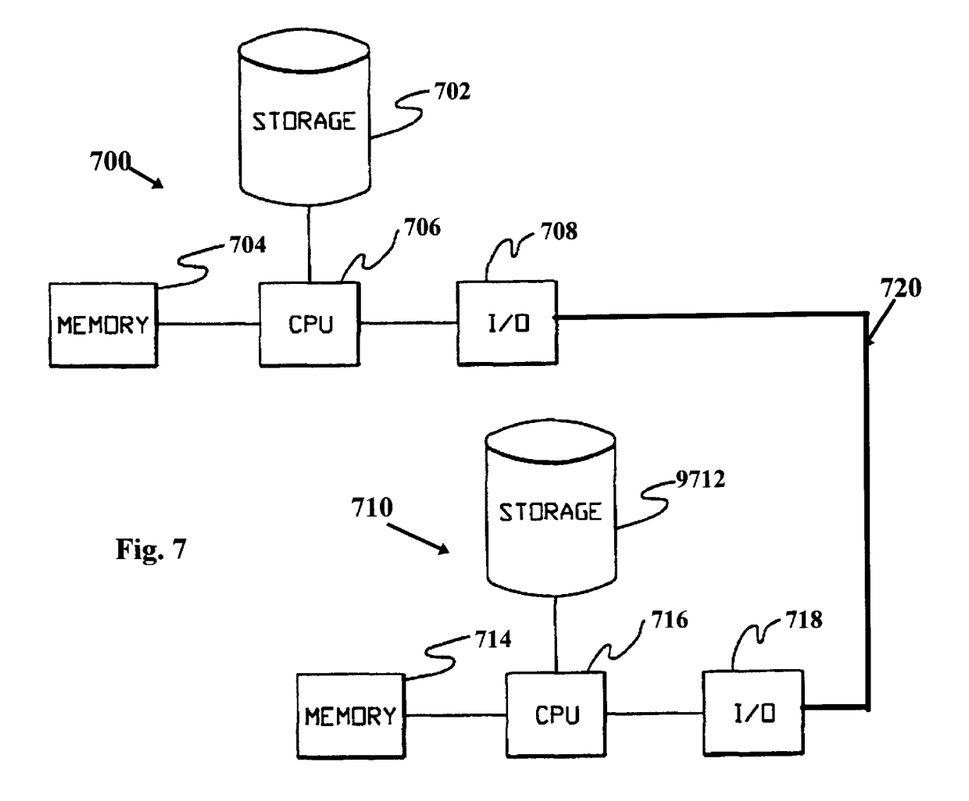
FIG. 7 is a high-level block diagram of a computer network capable of performing the SPECK algorithm illustrated in FIGS. 2A and 2B.

The hardware elements of a computer system used to implement the techniques of the present invention are shown in FIG. 7. A computer 700 includes a central processing unit ("CPU") 706 providing main processing functionality. A memory 704 is coupled to CPU 906 for providing operational storage of programs and data. Memory 704 may comprise, for example, random access memory ("RAM") or read-only memory ("ROM"). Nonvolatile storage of, for example, data files and programs is provided by a storage 702 that may comprise, for example, disk storage. Both memory 704 and storage 702 comprise a computer useable medium that may store computer program products in the form of computer readable program code. User input and output is provided by an input/output ("I/O") device 708. I/O facility 708 may include, for example, a graphical display, a mouse and/or a graphics tablet. As an example, the computer system 700 of FIG. 7 may comprise an International Business Machines RISC System/6000 computer executing an AIX operating system.

Moreover, as illustrated in FIG. 7, a second computer 710 advantageously can be connected to the computer 700 via a communications channel 720 to form a computer or communications network. It will be appreciated that network is used in its broadest sense, i.e., to denote a collection of machines that communicate with one another. Thus, while a local area network (LAN) is one form of network, the Internet, the plain old telephone system (POTS), to name but a few, are all networks and, thus, are considered to fall within the scope of the hardware implementation of the present invention. In one preferred embodiment, the computer 910 includes storage 912, memory 914, a CPU 916 and an I/O device 918. Although the computers 700 and 710 are illustrated in such a way that one could concluded that these computing devices are substantially similar, this need not be the case. For example, in FIG. 7, the computer 700 advantageously could be a personal computer whereas the computing device 710 advantageously could be a telephone or a personal digital assistant (PDA) device. Moreover, it will be appreciated that the CPU advantageously can be replaced by a digital signal processor (DSP). Preferably, the communications channel 720 connotes any type of data path which permits computer 700 to transfer data representing an image to computer 710.

It will be appreciated that the individual programming steps required to implement the techniques of the present invention will be apparent to one of ordinary skill in the art in view of the discussion presented herein.

One anticipated requirement of the next generation compression standard is the inclusion of a stringent memory constrained property. What this effectively means is that at any given time during the coding process, the coder should use only a limited amount of memory, which should be independent of the size of the image. If a coding scheme does not conform to this requirement, applications that require very large images on machines that have limited amount of workspace memory will find it impractical to use such a coding scheme. Hence, it is vital to have the coder use limited workspace memory, independent of the size of the image.

It should be mentioned that the wavelet transformation property that the SPECK algorithm utilizes transforms the entire image at once. Hence, the memory needed is of the order of the image size. In order to implement low-memory coders, it will be a appreciated that the wavelet transform module must be replaced by either a line-based or a block-based wavelet transform. It will also be appreciated that in the line-based transform, the entire image is not transformed at once. Rather, the image is read line-by-line until enough lines have been read in to perform a wavelet transformation with the particular wavelet filter. This generates a few lines of the transform coefficients corresponding to the lowest subband levels. These lines of transformed data advantageously can then be processed and then discarded from memory. Thus, this process of transforming lines of input data to generate lines of transform coefficients conserves memory.

It will be a appreciated that the encoder according to one low-memory alternative embodiment according to the present invention can keep accumulating these lines of coefficients in memory until enough data has been gathered to perform the SPECK algorithm. Once that data has been processed, the data can be discarded, i.e., the memory space can be freed for other purposes. A similar but reverse procedure occurs during the decoding process. This eliminates the need for an image to be stored in memory all at once.

In contrast to the octave-band partitioning process employed by the original SPECK algorithm discussed in detail above, the partitioning process in the low-memory embodiment of the present invention version advantageously can be predetermined. This alternative embodiment advantageously can employ non-overlapping fixed-size blocks within subbands of transforms, that are tiled up to cover the entire image. Typical block size ranges from 32×32 to 128×128, with 64×64 being the most common. It will be noted that the blocks are coded, independently of each other, into packets. Once a block is coded, the coded data is stored into a packet that is placed in a buffer memory, e.g., RAM. These packets, one for each coded block, preferably are stored in the buffer until all the blocks in the image transform have been processed or the desired rate target has been met.

It should be mentioned that the way in which the blocks are coded helps in reducing the amount of memory used by the coder. Transformed coefficients are passed on a line-by-line basis to the coder. As soon as a block is filled up with coefficients, the block is encoded using the SPECK algorithm. As previously mentioned, once the block is coded, the contents of the block are released from memory. In this way, blocks are coded as soon as they are filled up and then discarded from memory. This greatly reduces the amount of memory needed for the whole coding system.

It should also be mentioned that the blocks are coded in the same way as the SPECK algorithm codes sets of type S. Recursive quadtree partitioning advantageously can be used to test and partition the block being processed. Multiple lists are used to help keep track of the different sets and coefficients in the block. It is interesting to note that the lists are now associated with the blocks instead of the entire image. Hence, even the size of the list is greatly reduced. Also, the lists are reset after the coding of each block. Thus, it can be easily seen that all this contributes to a significant reduction in memory usage, and the amount of memory needed for the entire coding system is on the order of the size of blocks being processed.

It will be appreciated that since the preferred embodiment of the coder under discussion utilizes line-based wavelet transforms, it is important to know the order in which blocks of fixed size are visited. Assuming that the image is tiled into 64 blocks, with 8 blocks along each direction, a few lines of the original image will be read in until there are enough lines to do the transformation with the particular wavelet filter. It will be noted that this would result in a 1-level decomposition of the image.

It should be mentioned that since the subbands having the high frequency content will not be further decomposed, the coefficients corresponding to these subbands will be sent to the encoder. Hence, the Low-High, High-Low and High-High subbands, which are discussed in detail with respect to U. S. Pat. No. 5,764,807, will receive line coefficients. These subbands will keep receiving these lines of coefficients until enough lines have been received to fill up at least one block. Again, once a block is encoded, the coefficients belonging to the block are discarded from memory, freeing up memory space. This process continues in a similar fashion until all the blocks are filled up and coded. It will be noted that this is the order of coding blocks into packets. This order is changed to a predefined order, e.g., the regular raster scanning order for blocks, before forming the final bitstream for transmission. It is important to note that the reverse order of visiting the blocks takes place at the decoder, since the decoder will perform line-based inverse wavelet transformation.

As mentioned earlier, blocks are coded independently into packets which are stored in buffer memory. The final bitstream is generated by combining the packets in any arbitrary manner. There is great exibility in this postprocessing stage of bitstream generation. Depending on the type of coding desired, the final bitstream can be made either perfectly embedded or block-embedded, i.e., embedded within blocks. It will be appreciated that the requirement of perfect embeddedness can be relaxed a little by making the bitstream block-embedded, which means that the data within a packet/block will be embedded but the entire bitstream will not be strictly embedded. This would make the use of extra overhead redundancy and, hence, the coding performance would improve. Simply concatenating the coded packets together will result in a block-embedded bitstream.

In short, one of the most important implications of the SPECK algorithm is its potential for constructing low-memory usage coders. Although there are a few other coders meeting the same requirements, yet the key characteristic of the coder according to the present invention, which makes the SPECK algorithm stand apart from all of the rest, is the SPECK algorithm's low-complexity. This ensures very fast coding speeds, apart from exhibiting very good coding performance.

As discussed in detail above, the SPECK algorithm has proved to be a very effective image coding scheme. The SPECK algorithm is a block-based hierarchical coder which makes use of image statistics within a subband. It does not exploit inter-subband correlation and codes subbands independently of each other. SPECK has been seen to perform well for all types of natural images, but particularly well for high frequency images. The SPECK algorithm itself operates on each block independently. Coding of the significance map could employ the context significance states of pixels in other subbands, such as parent pixels in a spatial orientation tree structure. As mentioned above, entropy coding of significance map is optional. The SPIHT algorithm, on the other hand, is also a very successful and efficient image coding scheme. It is, however, a tree-based hierarchical coder which employs image statistics across subbands. Thus, the SPIHT algorithm exploits inter-subband correlation and codes various subbands at the same time, making use of their interdependency. SPIHT has also been seen to perform well for all types of natural images, but gives slightly better performance than SPECK for low frequency images. It will be appreciated from the discussion above, particularly considering that the LIS employed in the SPECK algorithm corresponds to both the LIS and LIP of the SPIHT algorithm, that a hybrid coder where the low frequency data of the image are coded using SPIHT algorithm while the high frequency data of the image are coded using SPECK algorithm advantageously can be provided.

Moreover, although the SPECK coding algorithm has been tested primarily on still images, there are many alternative paths to extend the SPECK algorithm to video. According to one preferred embodiment of the present invention, the SPECK algorithm can be employed with respect to video by employing a 3-D extension of the SPECK algorithm over a fixed or variable sequence of images. It will be appreciated that a three dimensional (3-D) wavelet transform advantageously can be applied over a sequence of images, and the whole image sequence can be partitioned in the form of cubes, instead of blocks, as is done for a single image frame. A simple extension of the 2-D SPECK algorithm to 3-D would code the image sequence in a manner analogous to the SPECK algorithm.

In another exemplary embodiment applying the SPECK algorithm to video coding, the SPECK algorithm advantageously can be applied to the motion-compensated image sequences. It will be appreciated that the current MPEG standards, i.e., MPEG-1, MPEG-2, and MPEG-4, support the concept of macroblocks, whereby blocks of image are entropy coded after adequate motion compensation. These video coding standards are thought to be generic in the sense that they do not specify any particular entropy-coding scheme by which to encode these macroblocks. Hence, the block-based SPECK algorithm discussed above meshes very well into the various MPEG frameworks.

Finally, it should be mentioned that while the SPECK coding algorithm has been tested primarily on gray-scale monochrome images, it will be appreciated that color images advantageously can be processed in a similar manner. Color images can be thought of as being composed of three monochrome images, corresponding to either the luminance and two chrominance components or red-green-blue (RGB) values, e.g., 24-bit true color. Hence, SPECK algorithm can be applied to each of these components or planes separately to code a color image. Moreover, additional coding efficiency advantageously can be achieved by taking advantage of the strong correlation among these different color components.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A method for use in encoding and decoding a data set representing an image, comprising:

a first subroutine for partitioning the data set into first and second sets, for adding the first set into a list of insignificant sets (LIS), and for initializing a list of significant pixels (LSP);

a second subroutine for testing the first and second sets for significance with respect to a threshold value, partitioning significant members of the first and second sets in accordance with first and second partitioning functions, respectively, and adding significant pixels to the LSP; a third subroutine for refining the quantization of the pixels in the LSP; and a fourth subroutine for decrementing the threshold value, wherein the second, third and fourth subroutines are repeated until encoding/decoding of the data set has been completed.

2. The method as recited in claim 1, wherein the fourth subroutine further comprises a routine for entropy coding a significance map generated in accordance with the second and third subroutines.

3. The method as recited in claim 1, wherein members of the first set demonstrating significance with respect to the threshold value are partitioned employing a quadtree partitioning scheme.

4. The method as recited in claim 3, wherein members of the first set demonstrating significance with respect to the threshold value are recursively partitioned employing a quadtree partitioning scheme.

5. The method as recited in claim 1, wherein members of the second set demonstrating significance are with respect to the threshold value partitioned employing octave band partitioning.

6. The method as recited in claim 5, wherein members of the second set demonstrating significance are with respect to the threshold value recursively partitioned employing octave band partitioning.

7. The method as recited in claim 2, wherein the subroutine for entropy coding is performed using arithmetic coding.

8. The method as recited in claim 1, wherein the image comprises a sequence of images which vary over time.

9. The method as recited in claim 1, wherein the second, third and fourth subroutines are repeated until one of the encoding/decoding of the data indicative of the lowest bit plane has been completed and the bit budget has been spent.

10. A coder for use in encoding and decoding a data set corresponding to an image, comprising:

first means for partitioning the data transformation into first and second sets, for adding the first set into a list of insignificant sets (LIS), and for initializing a list of significant pixels (LSP);

second means for testing the first and second sets for significance with respect to a threshold value, partitioning significant members of the first and second sets in accordance with first and second partitioning functions, respectively, and adding significant pixels to the LSP; and third means for refining the quantization of the pixels in the LSP;

wherein said second and third means are employed seriatim as the threshold value is decremented until encoding/decoding of the data set has been completed.

11. The coder as recited in claim 10, further comprising:

fourth means for entropy coding a significance map cooperatively generated by the second and third means.

12. The coder as recited in claim 10, wherein members of the first set demonstrating significance with respect to the threshold value are partitioned employing a quadtree partitioning scheme.

13. The coder as recited in claim 10, wherein members of the second set demonstrating significance are partitioned employing octave band partitioning.

14. The coder as recited in claim 11, wherein the fourth means performs entropy coding using arithmetic coding.

* * * * *